United States Patent
Hanmura et al.

(10) Patent No.: US 7,094,281 B2
(45) Date of Patent: Aug. 22, 2006

(54) BLACK INK COMPOSITION

(75) Inventors: Masahiro Hanmura, Nagano (JP); Tetsuya Aoyama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/913,292

(22) Filed: Aug. 6, 2004

(65) Prior Publication Data

US 2005/0076806 A1 Apr. 14, 2005

(30) Foreign Application Priority Data

Aug. 11, 2003 (JP) ............... 2003-291518

(51) Int. Cl.
C09D 11/02 (2006.01)
B41J 2/01 (2006.01)

(52) U.S. Cl. ............... 106/31.52; 106/31.46; 106/31.48; 106/31.5; 106/31.58; 347/100

(58) Field of Classification Search ............. 106/31.46, 106/31.48, 31.5, 31.52, 31.58; 347/100; 535/754
See application file for complete search history.

(56) References Cited

U.S. PATENT DOCUMENTS

| | | | | |
|---|---|---|---|---|
| 1,235,253 | A * | 7/1917 | Stebbins, Jr. | 534/813 |
| 5,536,819 | A * | 7/1996 | Tamura et al. | 106/31.52 |
| 5,772,742 | A * | 6/1998 | Wang | 106/31.27 |
| 6,451,989 | B1 * | 9/2002 | Beach et al. | 534/728 |
| 6,503,308 | B1 * | 1/2003 | Stramel et al. | 106/31.27 |
| 6,749,674 | B1 * | 6/2004 | Geisenberger et al. | 106/31.52 |
| 2002/0112642 | A1 * | 8/2002 | Sharma et al. | 106/31.43 |
| 2004/0020404 | A1 * | 2/2004 | Popal et al. | 106/31.5 |
| 2004/0040466 | A1 * | 3/2004 | Aoyama et al. | 106/31.52 |
| 2005/0087099 | A1 * | 4/2005 | Blease et al. | 106/31.27 |
| 2005/0087100 | A1 * | 4/2005 | Blease et al. | 106/31.47 |
| 2005/0126435 | A1 * | 6/2005 | Hanmura et al. | 106/31.46 |

FOREIGN PATENT DOCUMENTS

| | | |
|---|---|---|
| JP | 04-339874 | 11/1992 |
| JP | 04-339875 | 11/1992 |
| JP | 04-339876 | 11/1992 |
| JP | 05-148437 | 6/1993 |
| JP | 05-339527 | 12/1993 |
| JP | 06-166840 | 6/1994 |

OTHER PUBLICATIONS

Patent Abstracts of Japan Publication No. 04-339874 Published Nov. 26, 1992.

Patent Abstracts of Japan Publication No. 04-339875 Published Nov. 26, 1992.

Patent Abstracts of Japan Publication No. 04-339876 Published Nov. 26, 1992.

Patent Abstracts of Japan Publication No. 05-148437 Published Jun. 15, 1993.

Patent Abstracts of Japan Publication No. 05-339527 Published Dec. 21, 1993.

Patent Abstracts of Japan Publication No. 06-166840 Published Jun. 14, 1994.

* cited by examiner

Primary Examiner—Helene Klemanski
(74) Attorney, Agent, or Firm—Ladas and Parry LLP

(57) ABSTRACT

The present invention provides a black ink composition obtained by mixing at least one colorant selected from the group consisting of a compound represented by the following formula (1) and a salt thereof, one or more organic acids and one or more organic bases:

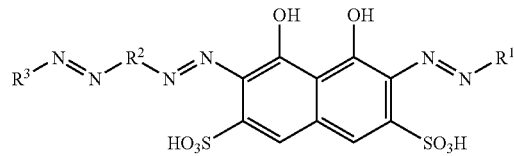

(1)

wherein $R^1$ represents a phenyl group having a substituent group or a naphthyl group having a substituent group, $R^2$ represent a phenylene group having a substituent group or a naphthylene group having a substituent group, $R^3$ represents a 5- to 7-membered heterocyclic ring having at least one double bond and substituent group, and further, the above-mentioned substituent groups in the above-mentioned $R^1$ to $R^3$ are each independently selected from the group consisting of OH, $SO_3H$, $PO_3H_2$, $CO_2H$, $NO_2$, $NH_2$, a C1–4 alkyl group, a C1–4 alkyl group having a substituent group, a C1–4 alkoxyl group, a C1–4 alkoxyl group having a substituent group, an amino group, an amino group having a substituent group and a phenyl group having a substituent group. Further, a recording method and recorded matter using the above-mentioned black ink composition are also disclosed.

14 Claims, No Drawings

BLACK INK COMPOSITION

FIELD OF THE INVENTION

The present invention relates to an ink composition excellent in light resistance and gas resistance, and further preventing inferior printing caused by air bubbles generated in an ink, the corrosion of a nozzle plate caused by a reduction in pH, and the like, because the decomposition of a colorant with time is suppressed.

BACKGROUND OF THE INVENTION

Ink jet recording is a process of ejecting an ink composition as small droplets through minute nozzles to record letters and images (hereinafter also simply referred to as "images") on a surface of a recording medium. The ink jet recording processes that have come in practice include a process of converting an electric signal to a mechanical signal using an electrostrictive element, thereby intermittently ejecting an ink composition stored in a nozzle head portion to record letters and images on a surface of a recording medium; a process of rapidly heating an ink composition stored in a nozzle head portion at a part very close to an ejection portion to generate bubbles, and intermittently ejecting the ink composition by volume expansion due to the bubbles to record letters and images on a surface of a recording medium; and the like.

Further, as an ink composition for ink jet recording, there is commonly used one in which various dyes are dissolved in water, an organic solvent or a mixed solution thereof, from the aspects of safety and print characteristics. In various characteristics, more strict conditions are required, compared to an ink composition for writing things such as a fountain pen and a ball pen.

In particular, in recent years, ink jet printers have come to be employed for the preparation of printed matter for advertisement. Printed matter prepared using an ink composition as described above is placed not only indoors as a matter of course, but also outdoors in some cases. Accordingly, the printed matter comes to be exposed to various lights including sunlight and the outdoor air (ozone, a nitrogen oxide, a sulfur oxide or the like), so that the phenomenon that image quality is deteriorated has occurred. In particular, the deterioration in a black colored portion is outstanding.

Consequently, black ink compositions excellent in light resistance and gas resistance have been developed. Together with these characteristics, it is also necessary to satisfy performances generally required for an ink composition for ink jet recording, such as no occurrence of nozzle clogging and no changes in composition and physical properties during storage, so long as it is the ink composition used for ink jet recording. The characteristics such as light resistance and gas resistance are largely dependent on a colorant used in the ink composition. When even a colorant excellent in light resistance and the like is decomposed during storage to generate air bubbles in the ink or largely changes the pH of the ink, it is necessary to develop usage preventing these problems to use. This is because the air bubbles in the ink block an ink flow path, so that they contribute to print omission cause due to pressure loss, and because a large decrease in pH during storage in an ink cartridge causes the corrosion of a nozzle plate. The corrosion of the nozzle plate deteriorates water repellency, so that it contributes to flight deflection of ink droplets to bring about deterioration in image quality.

As one of the countermeasures against such problems, pH adjustment in the preparation of the ink is conceivable.

As ink pH adjusting techniques proposed, there are a technique of adjusting the pH with an organic amine salt of a dicarboxylic acid for clogging prevention and recovery, high image quality, safety to the human body, and the like (see patent documents 1 to 3), a technique of adjusting the pH with an amine and an oxy acid for prevention of drying and improvements in print quality and dissolution stability (see patent document 4), and a technique of adjusting the pH with a glycolic acid (see patent document 5) However, these are not pH adjusting techniques for solving the above-mentioned problems.

Further, as a pH adjusting technique for keeping a change in ink pH with time to a minimum, there is a technique of adjusting the pH with an amine containing a substituent group selected from a sulfonic acid group, a carboxylic acid group and a halogen atom (see patent document 6). However, the decomposition of a colorant is not suppressed in this technique. In order to solve the above-mentioned problems, it becomes necessary to adjust the pH to a value at which the colorant is less decomposed, with a compound which accelerates the decomposition of the colorant as little as possible, in addition to making the pH difficult to change with time.

Patent Document 1: JP 4-339874 A
Patent Document 2: JP 4-339875 A
Patent Document 3: JP 4-339876 A
Patent Document 4: JP 5-148437 A
Patent Document 5: JP 5-339527 A
Patent Document 6: JP 6-166840 A

SUMMARY OF THE INVENTION

The present invention intends to solve the above-mentioned problems, and to provide a black ink composition high in light resistance and gas resistance and ensured in storage reliability (no deterioration in print quality caused by the generation of air bubbles due to decomposition with time or caused by the corrosion of a nozzle plate).

Other objects and effects of the present invention will become apparent from the following description.

The present inventors found that the above-mentioned problems can be solved by the use of a specific colorant excellent in light resistance and gas resistance, with an organic acid and an organic base. The present invention has been made based on this finding.

More specifically, the above-mentioned objects of the invention have been achieved by the following black ink compositions, ink jet recording methods and ink jet recorded matter.

1. A black ink composition obtained by mixing; at least one colorant selected from the group consisting of compounds represented by the below-shown formula (1) and salts thereof; one or more organic acids; and one or more organic bases:

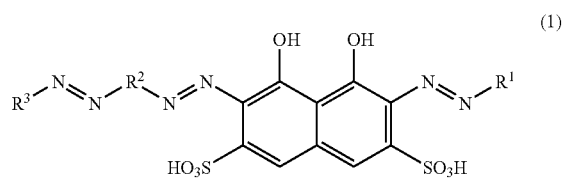

wherein $R^1$ represents a phenyl group having a substituent group or a naphthyl group having a substituent group, $R^2$ represent a phenylene group having a substituent group or a naphthylene group having a substituent group, $R^3$ represents a 5- to 7-membered heterocyclic ring having at least one double bond and substituent group, and further, the above-mentioned substituent groups in the above-mentioned $R^1$ to $R^3$ are each independently selected from the group consisting of OH, $SO_3$, $PO_3H_2$, $CO_2H$, $NO_2$, $NH_2$, a C1–4 alkyl group, a C1–4 alkyl group having a substituent group, a C1–4 alkoxyl group, a C1–4 alkoxyl group having a substituent group, an amino group, an amino group having a substituent group and a phenyl group having a substituent group;

2. The black ink composition described in the above 1, wherein the compounds represented by formula (1) and the salts thereof are at least one member selected from the group consisting of compounds represented by the following formula (2) and salts thereof:

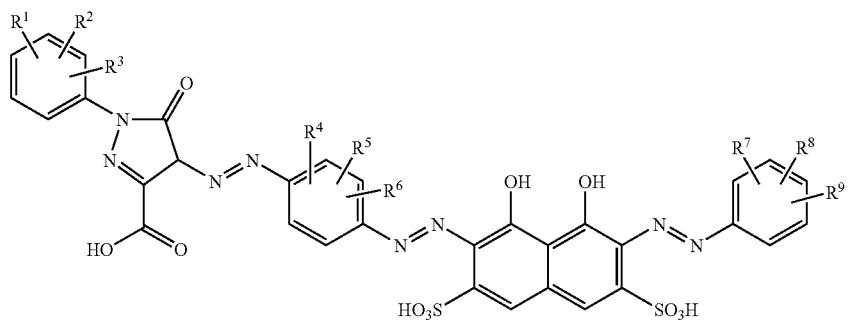

(2)

wherein $R^1$ to $R^9$ each independently represents a group selected from the group consisting of H, OH, $SO_3H$, $PO_3H_2$, $CO_2H$, $NO_2$ and $NH_2$;

3. The black ink composition described in the above 1 or 2, wherein the black ink composition has a pH at 20° C. immediately after the preparation thereof of from 7.4 to 8.0;

4. The black ink composition described in any one of the above 1 to 3, wherein the above-mentioned organic acid comprises at least one member selected from carboxylic acids;

5. The black ink composition described in the above 4, wherein the at least one member selected from the above-mentioned carboxylic acids comprises an aliphatic dicarboxylic acid;

6. The black ink composition described in the above 5, wherein the above-mentioned aliphatic dicarboxylic acid comprises succinic acid and/or adipic acid;

7. The black ink composition described in any one of the above 1 to 6, wherein the above-mentioned organic base comprises at least one member selected from tertiary amines;

8. The black ink composition described in any one of the above 1 to 7, wherein the above-mentioned organic base comprises at least one member selected from amino alcohols;

9. The black ink composition described in the above 8, wherein the at least one member selected from the above-mentioned amino alcohols comprises tripropanolamine;

10. The black ink composition described in any one of the above 1 to 9, wherein the total amount of the above-mentioned organic base(s) is from 0.1 to 0.4% by weight based on the total amount of the ink composition;

11. An ink jet recording method comprising ejecting a droplet of the black ink composition described in any one of the above 1 to 10, and depositing the droplet onto a recording medium to perform recording;

12. The ink jet recording method described in the above 11, wherein the above-mentioned ejection step is performed by mechanical deformation of an electrostrictive element;

13. Recorded matter recorded using the black ink composition described in any one of the above 1 to 10;

14. Recorded matter recorded by the ink jet recording method described in the above 11 or 12;

According to the invention, there can be provided the black ink composition high in light resistance and gas resistance (ozone resistance), and high in storage reliability. That is, the black ink composition of the invention is suppressed in decomposition of a colorant with time when stored in an ink pack or the like, and shows the excellent effect of preventing the occurrence of air bubbles and the corrosion of a nozzle plate, without deteriorating the light resistance and gas resistance.

DETAILED DESCRIPTION OF THE INVENTION

The black ink composition of the invention contains as a colorant at least one member selected from the group consisting of compounds represented by the following formula (1) and salts thereof:

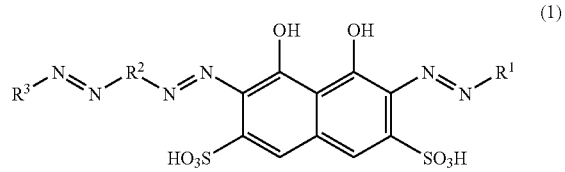

(1)

In formula (1), $R^1$ represents a phenyl group having a substituent group or a naphthyl group having a substituent group. Further, in formula (1), $R^2$ represent a phenylene group having a substituent group or a naphthylene group having a substituent group. Further, in formula (1), $R^3$ represents a 5- to 7-membered heterocyclic ring having at least one double bond and substituent group. Further, the above-mentioned substituent groups in the above-mentioned $R^1$ to $R^3$ independently represent a group selected from the group consisting of OH, $SO_3H$, $PO_3H_2$, $CO_2H$ $NO_2$, $NH_2$, a C1–4 alkyl group, a C1–4 alkyl group having a substituent group, a C1–4 alkoxyl group, a C1–4 alkoxyl group having a substituent group, an amino group, an amino group having a substituent group and a phenyl group having a substituent group).

Further, the above-mentioned substituted alkyl group is preferably selected from C1–4 alkyl groups substituted with one or more groups selected from the group consisting of OH, SO$_3$H, PO$_3$H$_2$, CO$_2$H and NH$_2$ groups. Besides, the above-mentioned substituted alkoxyl group is preferably selected from C1–4 alkoxyl groups substituted with one or more groups selected from the group consisting of OH, SO$_3$H, PO$_3$H$_2$, CO$_2$H and NH$_2$ groups. Additionally, the above-mentioned substituted amino group is preferably selected from the group consisting of amino groups having one or two C1–4 alkyl groups substituted with one or more groups selected from the group consisting of OH, SO$_3$H, PO$_3$H$_2$, CO$_2$H and NH$_2$ groups. Furthermore, the above-mentioned substituted phenyl group is preferably selected from the group consisting of phenyl groups having one or two substituent groups selected from the group consisting of OH, SO$_3$H, PO$_3$H$_2$, CO$_2$H, NH$_2$, a C1–4 alkyl group and a substituted C1–4 alkyl group.

Further, the compound represented by the above-mentioned formula (1), which is used in the invention, is more preferably compounds represented by the following formula (2):

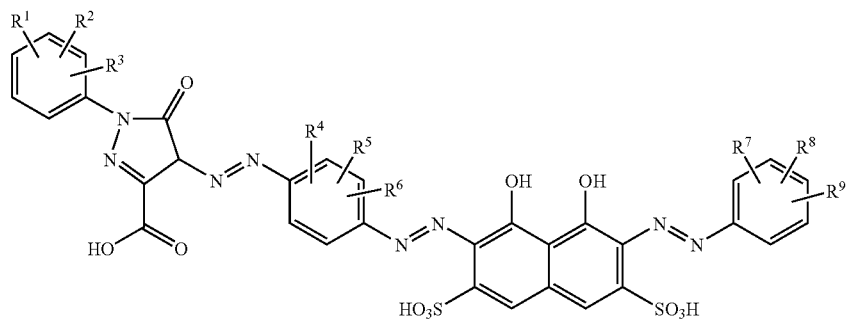

(2)

In the above-mentioned formula (2), R$^1$ to R$^9$ independently represent a group selected from the group consisting of H, OH, SO$_3$H, PO$_3$H$_2$, CO$_2$H, NO$_2$, and NH$_2$.

As the compound represented by the above-mentioned formula (1), which is used in the invention, particularly preferred are compounds represented by the following formulas (3) to (10);

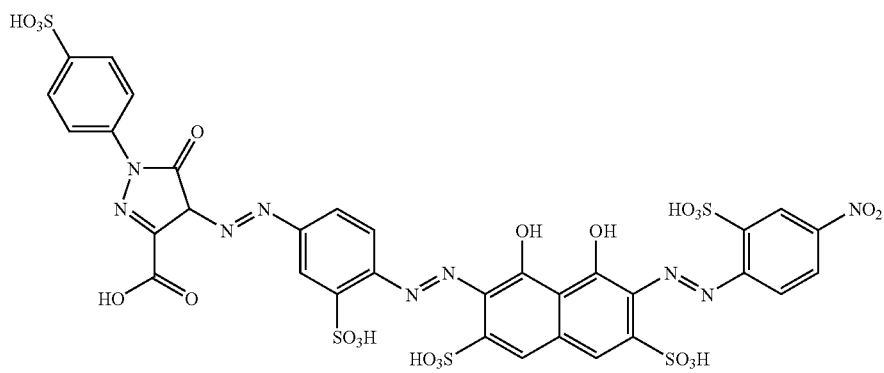

(3)

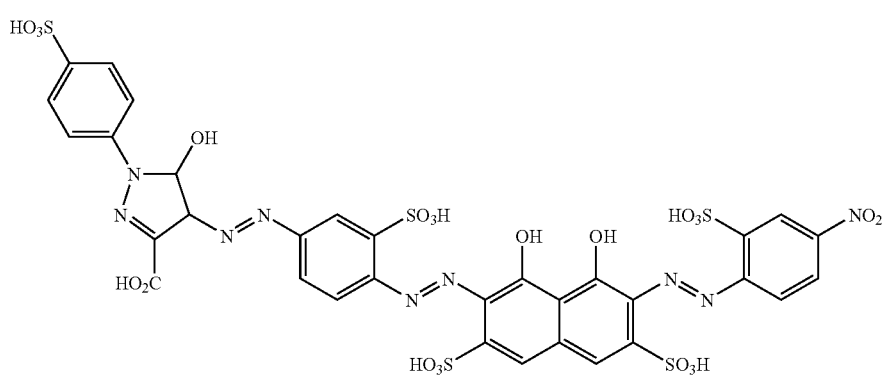

(4)

-continued
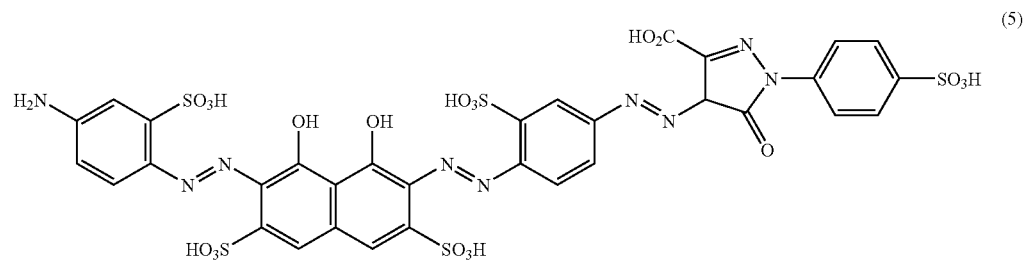
(5)
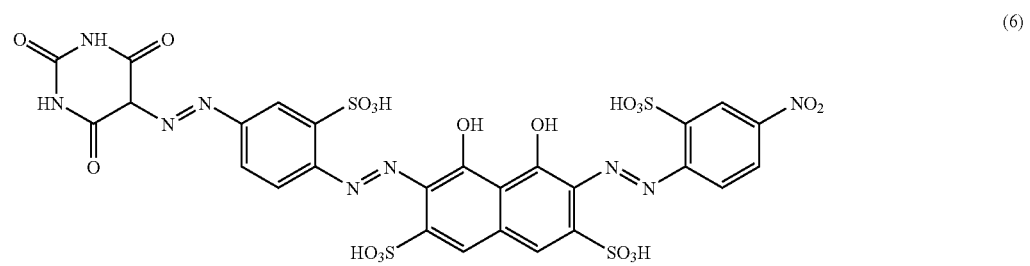
(6)
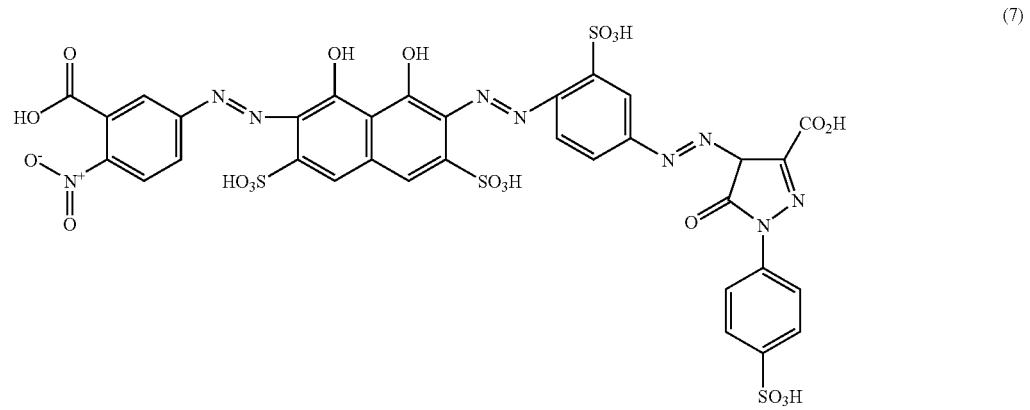
(7)
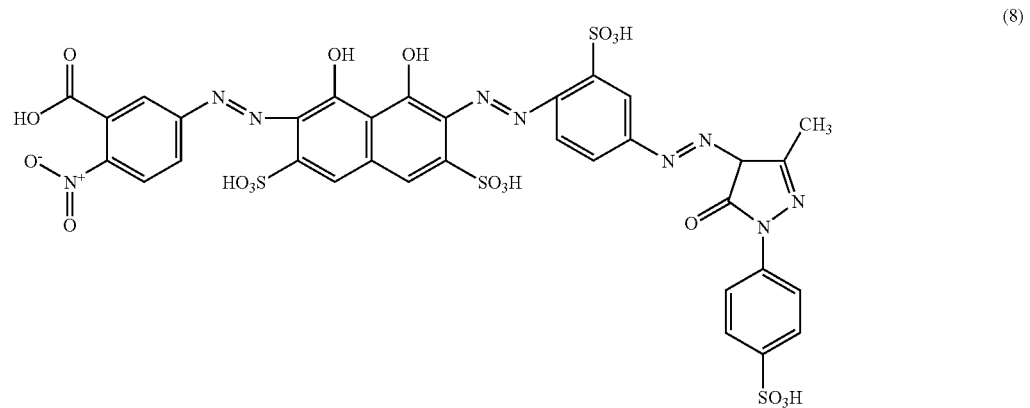
(8)

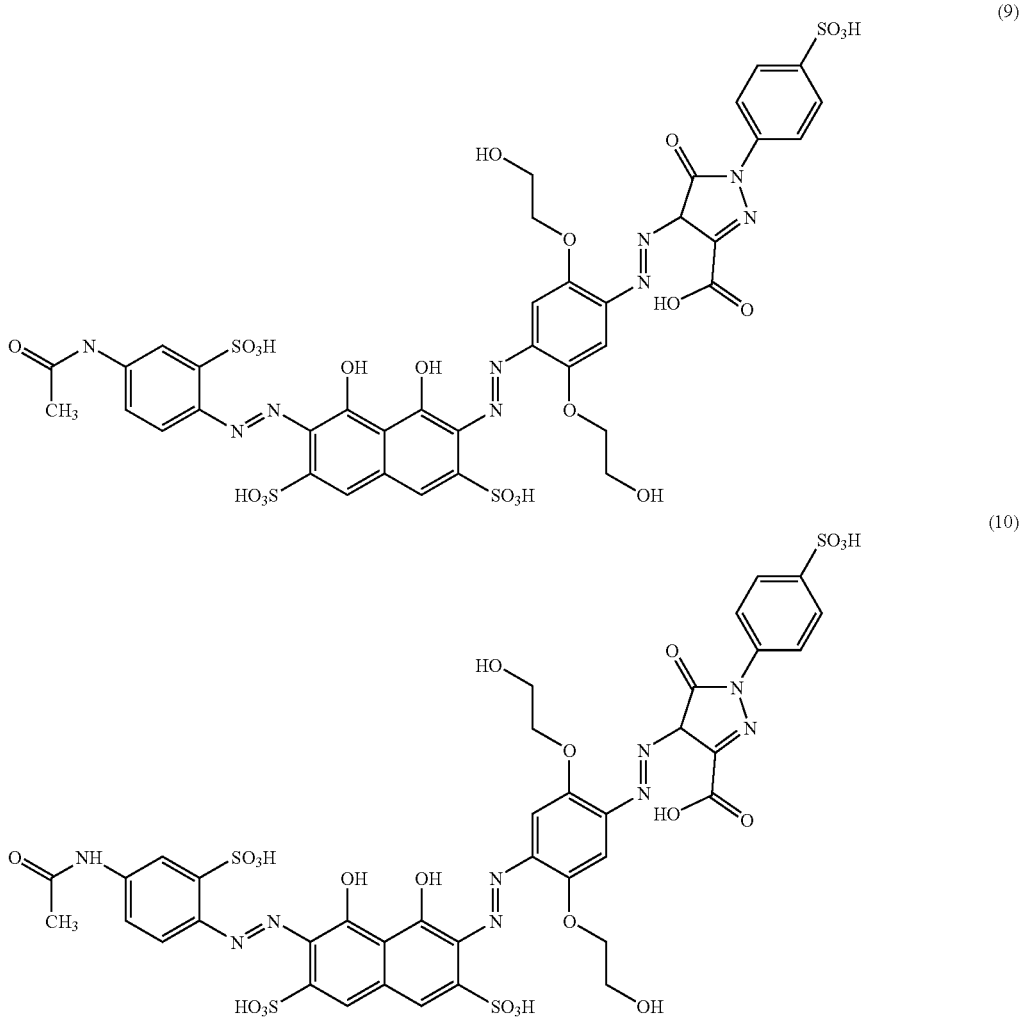

The compound represented by the above-mentioned formula (1) or (2), which is used in the black ink composition of the invention, can be appropriately synthesized using a preferred method. For example, in each compound, four building blocks having respective corresponding structures which are linked by three azo groups are bonded by azo coupling, thereby being able to synthesizing the compound. That is, for example, when a dihydroxynaphthalene skeleton moiety indicated in formula (1) is represented by Q, the compound of formula (1) can be represented by $R^3-N=N-R^2-N=N-Q-N=N-R^1$. When one specific method for synthesizing this compound is to be schematically shown, first, a diazonium salt obtained by diazotizing $R^1-NH_2$ is reacted with QH to prepare $R^1-N=N-QH$. Then, a compound obtained by diazotizing $CH_3CON-R^2-NH_2$ is coupled with $R^1-N=N-QH$ to synthesize $R^1-N=N-Q-N=N-R^2NCOCH_3$. The acetyl group of this compound is removed to replace with an amino group, followed by diazotization and subsequent coupling with $R^3H$, thereby being able to synthesize $R^1-N=N-Q-N=N-R^2-N=N-R^3$.

Further, as a specific example of synthesis, a synthesis example of the compound represented by the above-mentioned formula (3) is described below.

5-Acetylamino-2-aminobenzenesulfonic acid (23.0 g, 0.10 mol) was added to water (300 ml) containing concentrated nitric acid (30 ml). Sodium nitrite (6.9 g) was added at a temperature of 0 to 5° C. for 10 minutes. After 60 minutes, excess nitrous acid was decomposed, and the resulting diazonium salt solution was slowly poured into a solution of 1,8-dihydroxynaphthalene-3,6-disulfonic acid (32.0 g, 0.10 mol) in water (500 g), while maintaining at 5 to 10° C. at a pH of 8 to 9. It was confirmed by HPLC that this reaction had quantitatively proceeded. A coupling product-containing solution (referred to as a dye base) was obtained thereby.

Then, 5-nitro-2-aminobenzenesulfonic acid (43.6 g, 0.20 mol) was added to water (500 g) containing concentrated hydrochloric acid (60 g). Sodium nitrite (13.8 g) was added at a temperature of 0 to 5° C. for 15 minutes. After 60 minutes, the resulting diazonium salt solution was poured into the above-mentioned dye base to which tetrahydrofuran (1000 g) had previously been added, while maintaining at 5 to 10° C. at a pH of 6 to 7, for 120 minutes. After 5 hours, a precipitate formed was collected, and dried with a dryer. As a result, dark red solid matter (55.3 g) was obtained. This dark red solid matter was dissolved in water (1000 ml), and heated to 80° C. Sodium hydroxide (10 g) was added, and further, the temperature was maintained at 80° C. for 8 hours. After 8 hours, the pH was adjusted to 7 to 8 using concentrated hydrochloric acid, and the solution was allowed to cool to room temperature. This solution was dialyzed (less than 50 $\mu\text{Scm}^{-1}$) using a Visking (trade mark) tubing, filtered using a filter, and dried with a dryer. As a result, 47.2 g of black solid matter was obtained.

The black solid matter obtained above was dissolved in water again at a pH of 7 to 9. Lithium hydroxide was used for adjustment of the pH. Then, sodium nitrite (8.3 g) was added, followed by stirring for 10 minutes. Then, this dye/nitrite solution was transferred into ice water (100 ml) containing concentrated hydrochloric acid (30 g). Although the temperature was elevated to 15 to 25° C. after standing, it was allowed to stand as such for 3 hours. The resulting diazonium salt solution was added to a solution of 1-(4-sulfophenyl)-3-carboxy-5-pyrazolone (17.9 g, 0.06 mol), while maintaining at 15 to 20° C. at a pH of 6 to 7, for 120 minutes. This pH was maintained by adding lithium hydroxide. Then, this solution was dialyzed (less than 50 $\mu\text{Scm}^{-1}$) using a Visking (trade mark) tubing, further filtered using a filter, and dried with a dryer. As a result, 60.0 g of a compound represented by the above-mentioned formula (3) was obtained as black solid matter.

The salt of the compound represented by the above-mentioned formula (1) (hereinafter referred to as compound (1)) as used in the present specification includes salts of compound (1) and partial salts of compound (1), and further, the above-mentioned salts and the above-mentioned partial salts also include complex salts. The partial salt of compound (1) means a salt comprising ions having an equivalent lower than that of a protonic acid of compound (1), and compound (1). Further, the above-mentioned complex salt means the case where one molecule of compound (1) forms a salt with two or more kinds of ions. When compound (1) has a protonic acid such as an OH, $SO_3H$, $PO_3H_2$ or COOH group, the salts of compound (1) include but are not limited to one or more member selected from the group consisting of complex salts containing two or more members selected from the group consisting of an alkali metal salt, an ammonium salt and an organic ammonium salt of the compound, an alkali metal, ammonium and an organic-ammonium. The above-mentioned alkali metal salts include, for example, a lithium salt, a sodium salt, a potassium salt, a cesium salt and a salt containing two or more metals thereof, and a lithium salt and a sodium salt are particularly preferred.

In the black ink composition of the invention, the above-mentioned compounds (1) and the salts thereof can be used either singly or as a combination of two or more of them. When two or more are used in combination, two or more can be used from each category of compounds (1) and the salts thereof, or a total of two or more kinds of compounds over two kinds of categories can also be used.

At least one member selected from the group consisting of the above-mentioned compound (1) and the salt thereof (hereinafter simply referred to as "black dye (1)") is more excellent in light resistance and gas resistance than a conventional colorant, when it is used as a colorant of the black ink composition.

The concentration as the total amount of black dye (1) in the black ink composition of the invention can be appropriately selected according to the color value of black dye (1) used as the colorant. However, it is preferably contained in an amount of 0.5 to 12% by weight based on the total amount of the ink composition. 0.5% by weight or more can provide sufficiently good color development and high image density, when an image or the like is recorded on a recording medium using the ink composition. 12% by weight or less can adjust the viscosity of the ink composition to a preferred value, stabilize the discharge rate of the ink composition from an ink jet head, and further prevent clogging of the ink jet head.

Further, in the black ink composition of the invention, another colorant can also be used in combination, within the range that does not largely impair light resistance and gas resistance. The other colorant is not particularly limited, and any can be used as long as it is a dye or a pigment which can print black.

As such colorants, there are available various dyes used in ordinary ink, particularly for ink jet recording, for example, a direct dye, an acid dye, a food dye, a basic dye, a disperse dye, a vat dye, a soluble vat dye, a reactive dye and the like. Further, as the pigments, there are available black pigments such as carbon black.

The ink composition of the invention can contain a yellow dye as a complementary color dye for color tone adjustment.

The yellow dye may be any, as long as it is a dye which can indicate yellow. Specifically, examples thereof include C.I. Acid Yellow 1, 3, 11, 17, 19, 23, 25, 29, 36, 38, 40, 42, 44, 49, 59, 61, 70, 72, 75, 76, 78, 79, 98, 99, 110, 111, 127, 131, 135, 142, 162, 164 and 165; C.I. Direct Yellow 1, 8, 11, 12, 24, 26, 27, 33, 39, 44, 50, 55, 85, 86, 87, 88, 89, 110, 132, 142, 144 and 173; C.I. Reactive Yellow 1, 2, 3, 4, 6, 7, 11, 12, 1, 14, 15, 16, 17, 18, 22, 23, 24, 25, 26, 27, 37 and 42; C.I. Food Yellow 3 and 4; C.I. Solvent Yellow 15, 19, 21, 30 and 109; and the like. Of these, C.I. Acid Yellow 23; and C.I. Direct Yellow 50, 55, 86, 132 and 173 are preferred, because ink reliability such as color developability and clogging resistance can be ensured. Further, in addition to the above-mentioned effects, in order to keep light resistance better, C.I. Direct Yellow 86, 132 and 173 are particularly preferred.

The invention is characterized in that one or more organic acids and one or more organic bases are contained, together with the above-mentioned black dye (1). The single use of the organic acid or the organic base cannot adjust the ink composition to a desired pH. On the other hand, when the organic acid and the organic base are used in combination with each other, the combination has higher pH buffer capacity than combinations of an inorganic acid/an inorganic base, an inorganic acid/an organic base and an organic acid/an inorganic base. By using the organic acid and the organic base, particularly by adjusting the ink pH within a predetermined range described later, the decomposition of the above-mentioned black dye (1) is suppressed, making it possible to prolong the time taken until bubbles occur. Further, a fluctuation in pH is suppressed, and it does not happen that the ink pH is lower than 7.0, even after the elapse of time. Thus, the effect of being able to prevent the corrosion of a nozzle plate is exhibited.

The organic acids include a sulfonic acid and a carboxylic acid. However, a carboxylic acid is preferred from the standpoint of easy pH adjustment of the ink composition, and examples thereof include the following compounds.

As aliphatic monocarboxylic acids, there are acetic acid, propionic acid, butyric acid, sorbic acid and the like.

Aliphatic dicarboxylic acids include succinic acid, fumaric acid, maleic acid, malonic acid, glutaric acid, adipic acid, sebacic acid, dodecanoic diacid, brassylic acid and the like.

As aromatic carboxylic acids, there are benzoic acid, toluic acid, phenylacetic acid, phenoxyacetic acid, p-t-butylbenzoic acid, benzilic acid, mandelic acid, p-methoxyphenylacetic acid, isophthalic acid, terephthalic acid, 1,4-naphthalenedicarboxylic acid, β-naphthoic acid and the like.

Of the above, the aliphatic dicarboxylic acids are preferred from the viewpoints of solubility and safety. Further, succinic acid and adipic acid are particularly preferred because of their good solubility in water or an aqueous organic solvent and anticlogging characteristics.

The organic bases include, for example, the following compounds.

Amino alcohol-based organic bases include ethanolamine, diethanolamine, propanolamine, N-N-diethanolamine, N,N-dimethylethanolamine, N-(2-aminoethyl)ethanolamine, N-methyldiethanolamine, N,N-dibutylethanolamine, N-methylethanolamine, triethanolamine, tripropanolamine and the like.

Aliphatic organic bases include dimethylamine, diethylamine, dipropylamine, dibutylamine, dihexylamine, dioctylamine, trimethylamine, triethylamine, N-isopropylethylamine, N,N-diisopropylethylamine, dicylcohexylamine, ethylenediamine, N,N-dibenzylethylenediamine, 1,1,4,4-tetramethylethylenediamine (TMEDA) and the like.

Aromatic organic bases include N,N-dimethylaniline, N,N-diethylaniline and the like.

Heterocyclic organic bases include pyridine, 4-(N,N-dimethylamino)pyridine (DMAP), 4-methylaminopyridine, N-methylmorpholine, N-ethylmorpholine, piperidine, 4-methylpiperidine, piperazine, pyrrolidine, α-picoline, β-picoline, γ-picoline, a lutidine, quinoline, 1,4-di-azabicyclo[2,2,2]octane (DABCO), 1,8-diazabicyclo[5,4,0]-undec-7-ene (DBU) and the like.

Of these, those selected from the tertiary amines are preferred from the standpoint of suppressing the decomposition of black dye (1), and further, those selected from the amino alcohols are preferred from the viewpoint of solubility in water and an aqueous organic solvent. Tripropanolamine is particularly preferred because of the least decomposition of the above-mentioned black dye (1).

The amount of the organic base used is preferably from 0.1 to 0.4% by weight, and more preferably from 0.2 to 0.35% by weight, based on the total amount of the ink composition. 0.1% by weight or more makes it possible to adjust the pH of the ink composition at 20° C. after the elapse of time to 7.0 or more, whereas 0.4% by weight can suppress the decomposition of black dye (1).

The above-mentioned organic acid and organic base are used so that the pH at 20° C. immediately after the preparation of the ink composition becomes preferably 7.4 to 8.0, and more preferably 7.4 to 7.9. By the adjustment to such a pH, the ink pH at 20° C. is not lower than 7.0 even after the elapse of time, and black dye (1) is hard to decompose. The term "immediately after the preparation of the ink composition" as used herein means within one day at ordinary temperature after the termination of the preparation of the ink.

In the black ink composition of the invention, it is preferred that water or a mixed solvent of water and a water-soluble organic solvent is used as a main solvent.

As the water, there can be used ion exchanged water, ultrafiltrated water, reverse-osmosed water, distilled water or the like. Further, from the viewpoint of long-term storage, water subjected to various chemical sterilization treatments such as ultraviolet-light irradiation and addition of hydrogen peroxide is preferred. When the water is used as the main solvent, the content thereof is preferably from 40 to 90% by weight, and more preferably from 50 to 80% by weight.

The ink composition of the invention can further contain a humectant selected from water-soluble organic solvents having a lower vapor pressure than pure water, and/or saccharides. By containing the humectant, evaporation of water can be suppressed to moisturize the ink in an ink jet recording system. Further, the water-soluble organic solvent can improve ejection stability, or easily alter the viscosity without changing ink characteristics.

The water-soluble organic solvent means a medium having the ability to dissolve a solute, and is selected from organic, water-soluble solvents having a lower vapor pressure than water. Preferred specific examples thereof include polyhydric alcohols such as ethylene glycol, diethylene glycol, triethylene glycol, polyethylene glycol, propylene glycol, 1,3-propanediol, 1,5-propanediol, 1,2-hexanediol, 1,2,6-hexanetriol and glycerol; glycol ethers such as ethylene glycol monomethyl ether, ethylene glycol monobutyl ether, diethylene glycol monobutyl ether, triethylene glycol monoethyl ether, triethylene glycol monobutyl ether, propylene glycol monomethyl ether, propylene glycol monobutyl ether and dipropylene glycol monomethyl ether; nitrogen-containing solvents such as formamide, dimethylformamide, 1,3-dimethyl-2-imidazolidinone, 2-pyrrolidone and N-methyl-2-pyrrolidone; sulfur-containing solvents such as thiodiglycol and dimethyl sulfoxide; and the like.

Further, the saccharides include glucose, mannose, fructose, galactose, maltose, sucrose, maltitol, sorbitol, gluconolactone and the like.

The humectant is added preferably within the range of 5 to 50% by weight, more preferably within the range of 5 to 30% by weight, and still more preferably within the range of 5 to 20% by weight, based on the total amount of the ink composition. 5% by weight or more provides moisture retention, whereas 50% by weight or less results in easy adjustment to the viscosity used in ink jet recording.

Further, it is preferred that the black ink composition of the invention contain a nonionic surfactant as an additive effective for obtaining quick fixing (permeability) of the ink and keeping the roundness of one dot, at the same time.

The nonionic surfactants used in the invention include, for example, an acetylene glycol-based surfactant. As the acetylene glycol-based surfactant used in the invention, a compound represented by the following formula (11) is particularly preferably used.

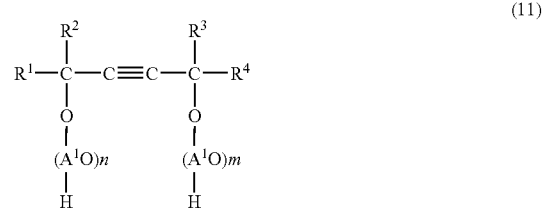

(11)

(In the formula, $R^1$, $R^2$, $R^3$ and $R^4$ each independently represents a C1–C6 straight-chain, cyclic or branched alkyl chain, and further, $A^1O$ and $A^2O$ each independently represents a C2–C3 oxyalkylene chain, for example, oxyethylene or oxypropylene, or a polyoxyalkylene chain obtained by polymerization or copolymerization of a C2–C3 alkylene oxide, for example, a polyoxyethylene chain, a polyoxypropylene chain or a polyoxyethylenepropylene chain. Further, in the formula, n and m represent the number of repetitions of $A^1O$ or $A^2O$ units, that is, the oxyalkylene, and are numbers satisfying $0 \leq n < 30$, $0 \leq m < 30$ and $0 \leq n+m < 50$.)

Specifically, such acetylene glycol-based surfactants include Surfynol 465 and Surfynol 104 (the above are manufactured by Air Products and Chemicals Inc., trade names (U.S.A.)) and Olfine STG and Olfine E1010 (the above are manufactured by Nissin Chemical Industry Co., Ltd., trade names). The amount thereof added is from 0.1 to 5% by weight, and preferably from 0.5 to 2% by weight, based on the total amount of the ink composition. Sufficient permeability is obtained by adjusting the amount added to 0.1% by weight or more. Further, the occurrence of a blur of images is easily prevented by adjusting it to 5% by weight or less.

Further, a water-soluble polymer such as sodium alginate, a water-soluble resin, a fluorine-based surfactant, an antifungal agent, a rust inhibitive agent and the like may be added to the ink composition of the invention as needed.

Examples of preservatives or the antifungal agent include sodium benzoate, pentachlorophenol sodium, sodium 2-pyridinethiol-1-oxide, sodium sorbate, sodium dehydroacetate, 1,2-dibenzothiazolin-3-one (Proxel CRL, Proxel BDN, Proxel GXL, Proxel XL-2 and Proxel TN (trade names) manufactured by AVECIA Limited) and the like.

Furthermore, examples of dissolution aids or antioxidants include metal hydroxides such as potassium hydroxide, sodium hydroxide and lithium hydroxide; ammonium salts such as ammonium hydroxide and a quaternary ammonium hydroxide (such as tetramethylammonium); carbonates such as potassium carbonate, sodium carbonate and lithium carbonate; phosphates; ureas such as urea, thiourea and tetramethylurea; allophanates such as allophanate and methylallophanate; biurets such as biuret, dimethylbiuret and tetramethylbiuret; and the like.

In the black ink composition of the invention, the above-mentioned optional components can be used either singly or as a mixture of plural kinds thereof selected in each group or among respective groups. However, no organic acid and no organic base are contained as the optional components.

Further, in the black ink composition of the invention, the amounts of all components of the ink composition are preferably selected so that the viscosity of the ink composition is less than 10 mPa·s at 20° C.

Furthermore, in the black ink composition of the invention, the surface tension thereof is preferably 45 mN/m or less at 20° C., and more preferably within the range of 25 to 45 mN/m.

Methods for preparing the black ink composition of the invention include, for example, a method of thoroughly mixing and dissolving respective components, pressure filtering the solution through a membrane filter having a pore size of 0.8 μm, and then, conducting deaeration treatment using a vacuum pump to prepare the composition, and the like.

The recording method of the invention using the above-mentioned black ink composition is described below. As the recording method of the invention, there can be particularly suitably used an ink jet recording system of ejecting the ink composition as droplets through minute nozzles, and adhering the droplets to a recording medium to perform recording. However, as a matter of course the composition can be used for applications, such as general writing materials, recorders and pen plotters.

As the ink jet recording system, there can be used any of the systems which have hitherto been known. It is possible to perform excellent image recording, particularly in a method of ejecting droplets utilizing the vibration of a piezoelectric element (a recording method of using an ink jet head which forms ink composition droplets by mechanical deformation of an electrostrictive element) or in a method utilizing heat energy.

EXAMPLES

The present invention will be illustrated in greater detail below with reference to the following Examples and Comparative Examples, but the invention should not be construed as being limited by the materials, compositions and preparation processes disclosed in those examples.

Preparation of Ink Compositions

Respective components were stirred at a compounding ratio shown in Table 1 at ordinary temperature for 1 hour, and filtered through a membrane filter having a pore size of 0.8 μm to obtain each ink composition having the composition shown in Table 1. The pH of the ink compositions shown in Table 1 is a value measured using a pH meter (Model PH82 manufactured by Yokogawa Electric Corporation). Each ink composition thus obtained was allowed to contact with dilute air of 5 mmHg in an airtight container for 10 minutes. The amount of dissolved $N_2$ was measured by gas chromatography. As a result, it was 2 ppm.

TABLE 1

| | | Ex. 1 | Ex. 2 | Ex. 3 | Ex. 4 | Ex. 5 | Ex. 6 | Ex. 7 |
|---|---|---|---|---|---|---|---|---|
| Colorant | Li Salt of Compound of Formula (3) | 5,000 | 5,000 | 5,000 | 5,000 | 5,000 | 5,000 | 5,000 |
| | C.I. Direct Black 154 | | | | | | | |
| | C.I. Direct Black 168 | | | | | | | |
| | C.I. Direct Black 195 | | | | | | | |
| Base | Tripropanolamine | 0.300 | 0.300 | 0.300 | | | | |
| | Triethanolamine | | | | 0.500 | | | 0.300 |
| | Diethylamine | | | | | 0.300 | | |
| | Trimethylamine | | | | | | 0.300 | |
| | Pyridine | | | | | | | |
| | NaOH | | | | | | | |
| Acid | Adipic Acid | 0.050 | 0.100 | | | | | |
| | Succinic Acid | | | 0.030 | | | | |
| | Acetic Acid 1 N | | | | 2.280 | 1.800 | 1.800 | 1.380 |
| | Hydrochloric Acid 1 N | | | | | | | |
| | β-Naphthoic Acid | | | | | | | |
| Other Ink Constituent Elements | Glycerol | 10,000 | 10,000 | 10,000 | 10,000 | 10,000 | 10,000 | 10,000 |
| | Triethylene Glycol Monobutyl Ether | 10,000 | 10,000 | 10,000 | 10,000 | 10,000 | 10,000 | 10,000 |
| | Triethylene Glycol | 3,000 | 3,000 | 3,000 | 2,800 | 3,000 | 3,000 | 3,000 |
| | 2-Pyrrolidone | 2,000 | 2,000 | 2,000 | 2,000 | 2,000 | 2,000 | 2,000 |

TABLE 1-continued

|  |  |  |  |  |  |  |  |  |
|---|---|---|---|---|---|---|---|---|
|  | Olfine E1010 (*1) | 1,000 | 1,000 | 1,000 | 1,000 | 1,000 | 1,000 | 1,000 |
|  | Proxel XL-2 (*2) | 0.300 | 0.300 | 0.300 | 0.300 | 0.300 | 0.300 | 0.300 |
| Adjusting Water | Extrapure Water | Bal. | Bal. | Bal. | Bal. | Bal. | Bal. | Bal. |
| Ink pH |  | 8.10 | 7.22 | 8.12 | 7.55 | 7.70 | 7.73 | 7.56 |

|  |  | Ex. 8 | Ex. 9 | Ex. 10 | Ex. 11 | Ex. 12 | Ex. 13 | Ex. 14 |
|---|---|---|---|---|---|---|---|---|
| Colorant | Li Salt of Compound of Formula (3) | 5,000 | 5,000 | 5,000 | 5,000 | 5,000 | 5,000 | 5,000 |
|  | C.I. Direct Black 154 |  |  |  |  |  |  |  |
|  | C.I. Direct Black 168 |  |  |  |  |  |  |  |
|  | C.I. Direct Black 195 |  |  |  |  |  |  |  |
| Base | Tripropanolamine | 0.300 | 0.500 | 0.100 |  |  |  | 0.300 |
|  | Triethanolamine |  |  |  |  |  | 0.300 |  |
|  | Diethylamine |  |  |  |  |  |  |  |
|  | Trimethylamine |  |  |  | 0.300 |  |  |  |
|  | Pyridine |  |  |  |  | 0.300 |  |  |
|  | NaOH |  |  |  |  |  |  |  |
| Acid | Adipic Acid |  |  | 0.023 | 0.100 | 0.085 | 0.082 |  |
|  | Succinic Acid |  | 0.110 |  |  |  |  | 0.070 |
|  | Acetic Acid 1 N |  |  |  |  |  |  |  |
|  | Hydrochloric Acid 1 N |  |  |  |  |  |  |  |
|  | β-Naphthoic Acid | 0.200 |  |  |  |  |  |  |
| Other Ink Constituent Elements | Glycerol | 10,000 | 10,000 | 10,000 | 10,000 | 10,000 | 10,000 | 10,000 |
|  | Triethylene Glycol Monobutyl Ether | 10,000 | 10,000 | 10,000 | 10,000 | 10,000 | 10,000 | 10,000 |
|  | Triethylene Glycol | 3,000 | 2,800 | 3,200 | 3,000 | 3,000 | 3,000 | 3,000 |
|  | 2-Pyrrolidone | 2,000 | 2,000 | 2,000 | 2,000 | 2,000 | 2,000 | 2,000 |
|  | Olfine E1010 (*1) | 1,000 | 1,000 | 1,000 | 1,000 | 1,000 | 1,000 | 1,000 |
|  | Proxel XL-2 (*2) | 0.300 | 0.300 | 0.300 | 0.300 | 0.300 | 0.300 | 0.300 |
| Adjusting Water | Extrapure Water | Bal. | Bal. | Bal. | Bal. | Bal. | Bal. | Bal. |
| Ink pH |  | 7.58 | 7.60 | 7.83 | 7.66 | 7.55 | 7.52 | 7.57 |

|  |  | Ex. 15 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|
| Colorant | Li Salt of Compound of Formula (3) | 5,000 | 5,000 | 5,000 | 5,000 |  |  |  |
|  | C.I. Direct Black 154 |  |  |  |  | 5,000 |  |  |
|  | C.I. Direct Black 168 |  |  |  |  |  | 5,000 |  |
|  | C.I. Direct Black 195 |  |  |  |  |  |  | 5,000 |
| Base | Tripropanolamine | 0.300 | 0.400 |  |  | 0.400 | 0.400 | 0.400 |
|  | Triethanolamine |  |  |  | 0.300 |  |  |  |
|  | Diethylamine |  |  |  |  |  |  |  |
|  | Trimethylamine |  |  |  |  |  |  |  |
|  | Pyridine |  |  |  |  |  |  |  |
|  | NaOH |  |  | 0.300 |  |  |  |  |
| Acid | Adipic Acid | 0.082 |  | 0.180 |  |  |  |  |
|  | Succinic Acid |  |  |  |  |  |  |  |
|  | Acetic Acid 1 N |  |  |  |  |  |  |  |
|  | Hydrochloric Acid 1 N |  |  |  | 0.100 |  |  |  |
|  | β-Naphthoic Acid |  |  |  |  |  |  |  |
| Other Ink Constituent Elements | Glycerol | 10,000 | 10,000 | 10,000 | 10,000 | 10,000 | 10,000 | 10,000 |
|  | Triethylene Glycol Monobutyl Ether | 10,000 | 10,000 | 10,000 | 10,000 | 10,000 | 10,000 | 10,000 |
|  | Triethylene Glycol | 3,000 | 2,900 | 3,200 | 3,000 | 2,900 | 3,000 | 3,000 |
|  | 2-Pyrrolidone | 2,000 | 2,000 | 2,000 | 2,000 | 2,000 | 2,000 | 2,000 |
|  | Olfine E1010 (*1) | 1,000 | 1,000 | 1,000 | 1,000 | 1,000 | 1,000 | 1,000 |
|  | Proxel XL-2 (*2) | 0.300 | 0.300 | 0.300 | 0.300 | 0.300 | 0.300 | 0.300 |
| Adjusting Water | Extrapure Water | Bal. | Bal. | Bal. | Bal. | Bal. | Bal. | Bal. |
| Ink pH |  | 7.60 | 8.40 | 7.60 | 7.70 | 8.30 | 8.30 | 8.30 |

Numerical values given in the table indicate percents by weight based on the total amount of the ink composition.
(*1): Acetylene glycol-based surfactant, manufactured by Nissin Chemical Industry Co., Ltd.
(*2): Preservative, manufactured by AVECIA Limited The colorant used in Examples 1 to 15 and Comparative Examples 1 to 3 is a Li salt of the compound represented by formula (3) shown in the above-mentioned specific examples, and structural formulas of the other colorants used in Comparative Examples 4 to 6 are as shown below:

C.I. Direct Black 154

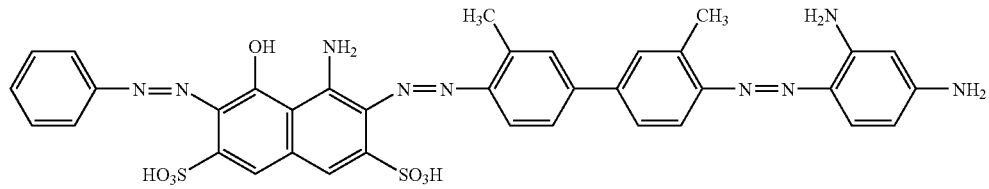

C.I. Direct Black 168

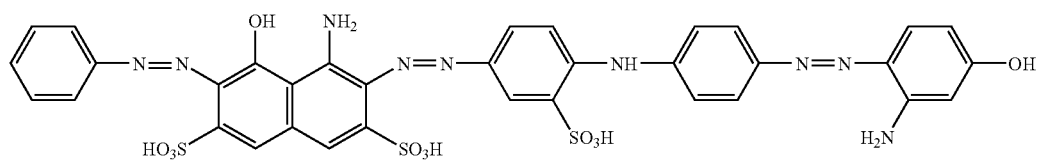

C.I. Direct black 195

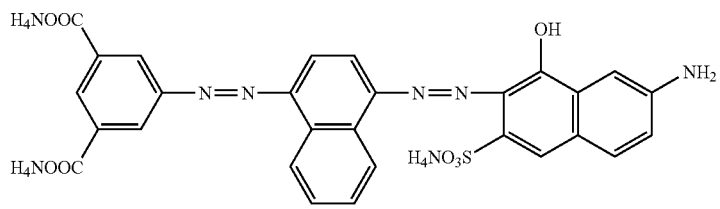

Printing of Recorded Matter

Using an ink jet printer, Stylus Color 880 (trade mark) (trade name, manufactured by Seiko Epson Corporation), the black ink compositions of Examples 1 to 15 and Comparative Examples 1 to 6 were each loaded into a cartridge for a black ink exclusive use of this printer, and printing was performed on PM Photographic Paper (trade name, manufactured by Seiko Epson Corporation, model number: KA420SK) in the following manner to obtain recorded matter.

Using the above-mentioned ink cartridge, the duty was adjusted so that the OD (optical density) value was within the range of 0.9 to 1.1 for each ink composition, and printing was performed. The resulting recorded mater was allowed to stand for one day in an environment of ordinary temperature and humidity not subjected to direct sunlight, and then, the following characteristics of a recorded image were tested. The results are shown in Table 2.

Light Resistance Test

Using a fluorescent lighting light resistance tester, SFT-11 (trade name, manufactured by Suga Test Instruments Co., Ltd.), the above-mentioned recorded matter was subjected to light irradiation for 21 days under conditions of a temperature of 24° C., a humidity of 60% RH and an illuminance of 70,000 lux. Using a reflection densitometer, Spectrolino (trade mark) (trade name, manufactured by GRETAG Co.), the OD values (optical density) of the recorded matter before and after the light irradiation were measured. The COD values were measured at a visual field angle of 2°, using D50 as a light source, using no light source filter, and using absolute white as a white color standard. Using the following calculation equation 1, the optical density residual rate (relict optical density: ROD) of the image of each recorded matter after the light irradiation was determined from the resulting measurement value (OD value) by calculation.

$$ROD(\%)=(Dn/Do)\times 100 \qquad \text{(equation 1)}$$

(wherein $Dn$ is the OD value of the image after the termination of the light irradiation test, $Do$ is the OD value of the image before the light irradiation test)

Based on the resulting ROD, the test results were rated A to D using the following judging criteria, thereby evaluating the light resistance of the recorded matter.

A: ROD was 80% or more,
B: ROD was from 60% to less than 80%.
C: ROD was from 40% to less than 60%.
D: ROD was less than 40%.

The higher ROD is preferred because of less deterioration in the image caused by the light irradiation.

Gas Resistance (Ozone Resistance) Test

Using Ozone Weather Meter, Type OMS-H (trade name, manufactured by Suga Test Instruments Co., Ltd.), the above-mentioned recorded matter was exposed to ozone for 24 hours under conditions of a temperature of 24° C., a humidity of 60% RH and an ozone concentration of 10 ppm. Using a reflection densitometer, Spectrolino (trade mark) (trade name, manufactured by GRETAG Co.), the OD values (optical density) of the recorded matter before and after the ozone exposure were measured. The measurement thereof was made under conditions of a visual field angle of 2°, using D50 as a light source, using no light source filter, and using absolute white as a white color standard. Using the same calculation method as in the above-mentioned light resistance test and the same judging criteria as in the above-mentioned light resistance test, the results obtained were rated A to D, thereby evaluating the ozone resistance of the recorded matter. The higher ROD shows less deterioration in the image caused by the ozone exposure.

Clogging Resistance Test

Printing was continuously performed for 10 minutes, using an ink cartridge loaded with each ink composition having the composition shown in Table 1. After the confirmation that the ink composition was normally ejected from all nozzles, a power source was turned off, and a printer was allowed to stand for 21 days in an environment of 60° C. and 15% RH. After standing, a cleaning operation was repeated until the ink composition was ejected from all nozzles equally to the initial stage, and clogging characteristics were evaluated according to the following judging criteria:

A: All nozzles were restored by 1 to 4 cleaning operations.
B: All nozzles were restored by 5 to 8 cleaning operations.
C: All nozzles were restored by 9 to 12 cleaning operations.
D: Restration of all nozzles could not be attained by 13 cleaning operations.

Ink Storage Stability Test

An ink pack of each ink composition having the composition shown in Table 1 was prepared, and stored at 70° C. for 4 days or for 6 days. The ink pack was composed of polypropylene sheets, and obtained by stacking two sheets on each other, heat welding the periphery thereof to form a bag, loading the ink composition therein, and closing an opening by heat welding so as not to allow the air to enter therein. After the storage, the presence or absence of the generation of air bubbles was visually confirmed, and the $N_2$ concentration and pH were measured after the storage for 6 days. The $N_2$ concentration was evaluated according to the following criteria. The $N_2$ concentration was measured by gas chromatography. The pH was measured at 20° C. using a pH meter (Model PH82 manufactured by Yokogawa Electric Corporation). (In Table 2, the results after the storage for 4 days are shown as ink storage stability 1, and the results after the storage for 6 days are shown as ink storage stability 2.)

A: The $N_2$ concentration was less than 7 ppm.
B: The $N_2$ concentration was from 7 ppm to less than 9 ppm.
C: The $N_2$ concentration was from 9 ppm to less than 11 ppm.
D: The $N_2$ concentration was 11 ppm or more.

Odor

Black solid printing was performed on PM Photographic Paper (trade name, manufactured by Seiko Epson Corporation, model number: KA420PSK) in the following printer drive mode:

Paper setting: PM photographic paper, Ink; black, Mode setting: recommended setting, fine.

TABLE 2

| | Light Resistance | Gas Resistance | Clogging Resistance | Ink Storage Stability 1 Bubbles | Ink Storage Stability 2 | | | | | |
|---|---|---|---|---|---|---|---|---|---|---|
| | | | | | Bubbles | $N_2$ Conc. (ppm) | $N_2$ Level | pH | d(pH) | Odor |
| Ex. 1 | A | A | A | None | Generated | 11 | D | 7.82 | −0.28 | None |
| Ex. 2 | A | A | C | None | None | 5.89 | A | 6.88 | −0.34 | None |
| Ex. 3 | A | A | A | None | Generated | 11 | D | 7.84 | −0.28 | None |
| Ex. 4 | A | A | A | None | None | 10.35 | C | 7.03 | −0.52 | Slight acetic acid odor, but no problem level |
| Ex. 5 | A | A | B | None | None | 9.88 | C | 7.16 | −0.54 | Slight acetic acid odor, but no problem level |
| Ex. 6 | A | A | B | None | None | 8.33 | B | 7.39 | −0.34 | Slight acetic acid odor, but no problem level |
| Ex. 7 | A | A | B | None | None | 7.65 | B | 7.21 | −0.35 | Slight acetic acid odor, but no problem level |
| Ex. 8 | A | A | C | None | None | 6.15 | A | 7.35 | −0.23 | None |
| Ex. 9 | A | A | A | None | None | 10.03 | C | 7.07 | −0.53 | None |
| Ex. 10 | A | A | B | None | None | 5.88 | A | 7.02 | −0.81 | None |
| Ex. 11 | A | A | B | None | None | 9.87 | C | 7.14 | −0.52 | None |
| Ex. 12 | A | A | B | None | None | 9.11 | C | 7.04 | −0.51 | None |
| Ex. 13 | A | A | B | None | None | 7.61 | B | 7.18 | −0.34 | None |
| Ex. 14 | A | A | B | None | None | 6.22 | A | 7.32 | −0.25 | None |
| Ex. 15 | A | A | B | None | None | 6.24 | A | 7.34 | −0.26 | None |
| Comp. Ex. 1 | A | A | A | Generated | Generated | 11 | D | 8.07 | −0.33 | None |
| Comp. Ex. 2 | A | A | B | None | None | 6.13 | A | 6.48 | −1.12 | None |
| Comp. Ex. 3 | A | A | B | None | None | 7.32 | B | 6.72 | −0.98 | None |
| Comp. Ex. 4 | D | C | B | None | None | 5.22 | A | 8.29 | −0.01 | None |
| Comp. Ex. 5 | C | D | B | None | None | 5.1 | A | 8.31 | 0.01 | None |
| Comp. Ex. 6 | D | B | B | None | None | 4.89 | A | 8.32 | 0.02 | None |

The ink composition of Comparative Example 1 generates bubbles after the storage for 4 days, and the ink compositions of Comparative Examples 4 to 6 is deteriorated in light resistance or gas resistance. For the ink composition of Comparative Example 2, the ink pH after the storage for 6 days is low, and it is highly possible that a nozzle plate corrodes to cause a problem. In contrast, the ink compositions of Examples 1 to 15 were all excellent in light resistance and gas resistance and at a level within the available range also for clogging resistance, and no generation of bubbles was observed after the storage for 4 days. Further, a change in ink pH after the storage for 6 days was also suppressed.

While the present invention has been described in detail and with reference to specific embodiments thereof, it will be apparent to one skilled in the art that various changes and modifications can be made therein without departing from the spirit and scope thereof.

The present application is based on Japanese patent application No. 2003-291518 filed Aug. 11, 2003, the content thereof being herein incorporated by reference.

What is claimed is:

1. A black ink composition obtained by mixing: at least one colorant selected from the group consisting of compounds represented by the below-shown formula (1) and salts thereof; one or more organic acids; and one or more organic bases:

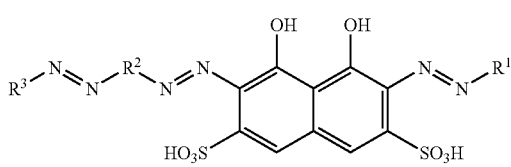

(1)

wherein $R^1$ represents a phenyl group having a substituent group or a naphthyl group having a substituent group, $R^2$ represent a phenylene group having a substituent group or a naphthylene group having a substituent group, $R^3$ represents a 5- to 7-membered heterocyclic ring having at least one double bond and substituent group, and further, the above-mentioned substituent groups in the above-mentioned $R^1$ to $R^3$ are each independently selected from the group consisting of OH, $SO_3H$, $PO_3H_2$, $CO_2H$, $NO_2$, $NH_2$, a C1–4 alkyl group, a C1–4 alkyl group having a substituent group, a C1–4 alkoxyl group, a C1–4 alkoxyl group having a substituent group, an amino group, an amino group having a substituent group and a phenyl group having a substituent group.

2. The black ink composition according to claim 1, wherein the compounds represented by formula (1) and the salts thereof are at least one member selected from the group consisting of compounds represented by the following formula (2) and salts thereof:

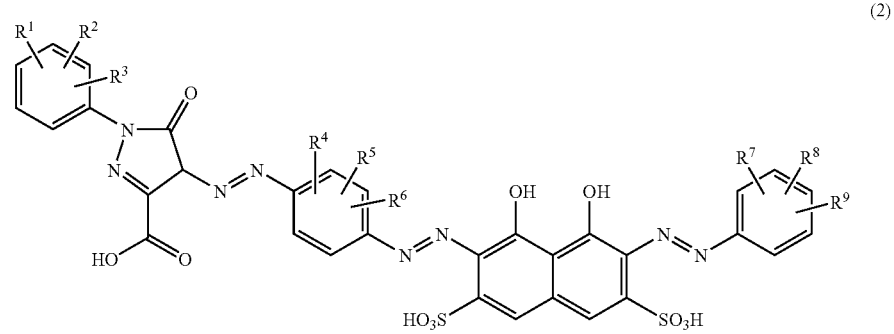

(2)

wherein $R^1$ to $R^9$ each independently represents a group selected from the group consisting of H, OH, $SO_3H$, $PO_3H_2$, $CO_2H$, $NO_2$ and $NH_2$.

3. The black ink composition according to claim 1, wherein the black ink composition has a pH at 20° C. immediately after the preparation thereof of from 7.4 to 8.0.

4. The black ink composition according to claim 1, wherein the organic acid comprises at least one carboxylic acid.

5. The black ink composition according to claim 4, wherein the at least one carboxylic acid comprises an aliphatic dicarboxylic acid.

6. The black ink composition according to claim 5, wherein the aliphatic dicarboxylic acid comprises succinic acid and/or adipic acid.

7. The black ink composition according to claim 1, wherein the organic base comprises at least one tertiary amine.

8. The black ink composition according to claim 1, wherein the organic base comprises at least one amino alcohol.

9. The black ink composition according to claim 8, wherein the at least one the amino alcohol comprises tripropanolamine.

10. The black ink composition according to claim 1, wherein the total amount of the organic base(s) is from 0.1 to 0.4% by weight based on the total amount of the ink composition.

11. An ink jet recording method comprising ejecting a droplet of the black ink composition according to claim 1, and depositing the droplet onto a recording medium to perform recording.

12. The ink jet recording method according to claim 11, wherein the ejection step is performed by mechanical deformation of an electrostrictive element.

13. Recorded matter recorded using the black ink composition according to claim 1.

14. Recorded matter recorded by the ink jet recording method according to claim 11.

* * * * *